United States Patent
Ball

(10) Patent No.: US 10,359,059 B2
(45) Date of Patent: Jul. 23, 2019

(54) SYSTEM AND METHODS FOR ACTUATING AN OBJECT

(71) Applicant: Cornell University, Ithaca, NY (US)

(72) Inventor: Erick Ball, Ithaca, NY (US)

(73) Assignee: Cornell University, Ithaca, NY (US)

( * ) Notice: Subject to any disclaimer, the term of this patent is extended or adjusted under 35 U.S.C. 154(b) by 203 days.

(21) Appl. No.: 15/033,687

(22) PCT Filed: Oct. 30, 2014

(86) PCT No.: PCT/US2014/063090
§ 371 (c)(1),
(2) Date: May 2, 2016

(87) PCT Pub. No.: WO2015/066286
PCT Pub. Date: May 7, 2015

(65) Prior Publication Data
US 2016/0252111 A1    Sep. 1, 2016

Related U.S. Application Data

(60) Provisional application No. 61/899,183, filed on Nov. 2, 2013.

(51) Int. Cl.
    F15B 15/10    (2006.01)
    B25J 9/10     (2006.01)
    B25J 9/14     (2006.01)

(52) U.S. Cl.
    CPC ........... F15B 15/103 (2013.01); B25J 9/1075 (2013.01); B25J 9/142 (2013.01)

(58) Field of Classification Search
    CPC .................................................. F15B 15/103
    See application file for complete search history.

(56) References Cited

U.S. PATENT DOCUMENTS

| | | | |
|---|---|---|---|
| 2,844,126 A * | 7/1958 | Gaylord | F15B 15/103 138/30 |
| 4,751,869 A | 6/1988 | Paynter | |
| 6,223,648 B1 | 5/2001 | Erickson | |
| 2002/0108491 A1 | 8/2002 | Stahn | |
| 2006/0249017 A1 | 11/2006 | Hiramatsu | |
| 2007/0197943 A1 | 8/2007 | Hawkonson | |
| 2009/0301292 A1 | 12/2009 | Kothera | |
| 2011/0067563 A1 * | 3/2011 | Woods | A61F 2/08 92/90 |

* cited by examiner

Primary Examiner — F Daniel Lopez
(74) Attorney, Agent, or Firm — Valauskas Corder LLC

(57) ABSTRACT

Disclosed are a system and methods for actuating an object. The system includes a knitted sleeve within which is disposed a pressurizable bladder.

18 Claims, 5 Drawing Sheets

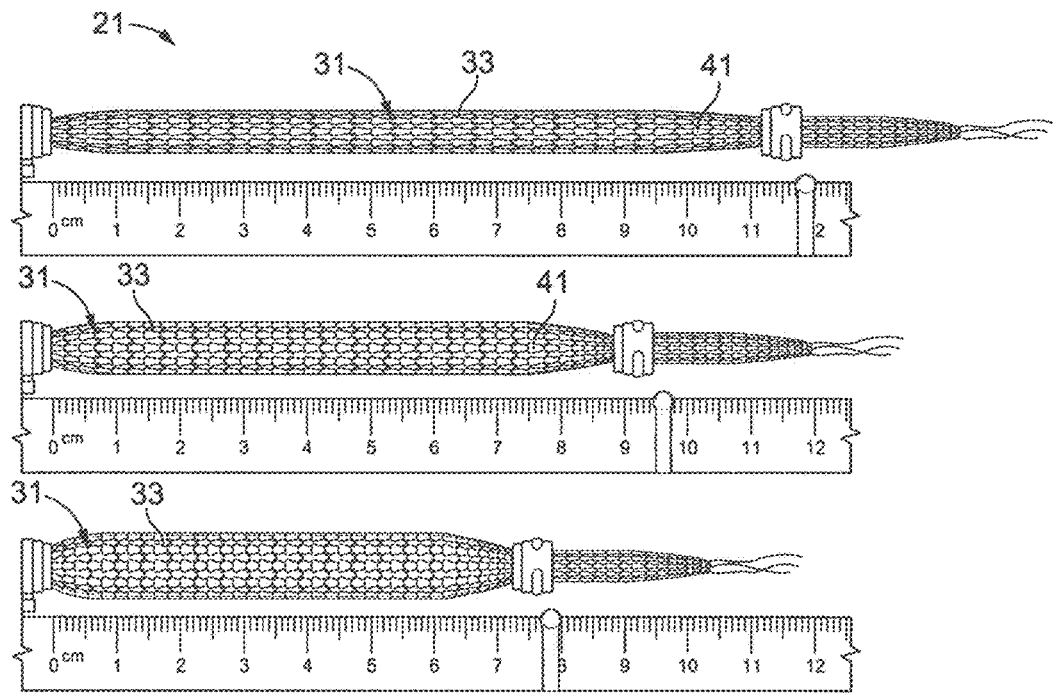
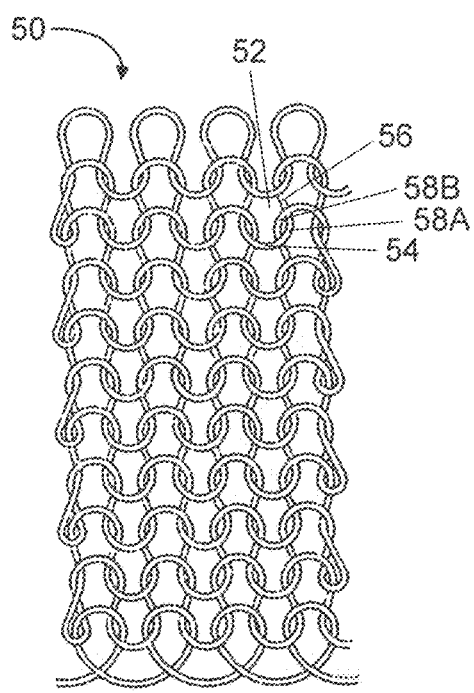
FIG. 2A
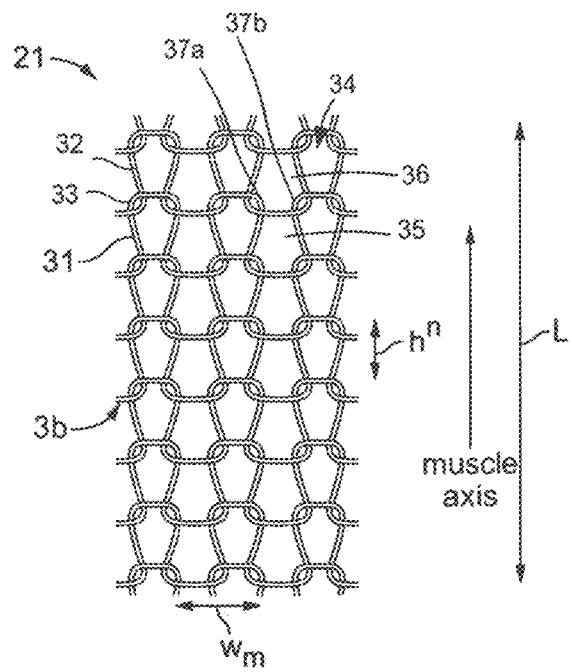
FIG. 2B

US 10,359,059 B2

SYSTEM AND METHODS FOR ACTUATING AN OBJECT

CROSS-REFERENCE TO RELATED PATENTS

This application claims the benefit of International Application No. PCT/US2014/063090 filed Oct. 20, 2014, which claims the benefit of U.S. Provisional Application No. 61/899,183 filed Nov. 2, 2013.

STATEMENT REGARDING FEDERALLY SPONSORED RESEARCH OR DEVELOPMENT

Not applicable.

BACKGROUND OF THE INVENTION

Artificial muscle actuators are used in various applications, including robotics, biomimetic systems, medical devices, and aerospace systems. Artificial muscles are designed to approximate biological muscles in shape and motion. They function as tensile actuators, usually with little or no ability to apply compressive force, and, as a result, may be constructed from soft and/or lightweight materials. Among the fluidic artificial muscles, which are controlled by the application of pressurized gas or liquid, force-to-weight and power-to-weight ratios can be quite high, but maximum contraction is usually limited to 40% and often less.

The most common type of fluidic muscle, the "McKibben muscle", is relatively easy to manufacture. The McKibben muscle consists of a tubular bladder, made of a material like rubber, with a pressure inlet at one end, enclosed in a braided, bias-woven fiber sleeve. Each fiber of the braided sleeve winds in a helical path around the bladder. The bladder and sleeve are clamped together at each end. When the bladder is pressurized, it presses outward on the sleeve, causing the sleeve to expand radially, increasing the fiber angle and decreasing the length of the muscle as the internal volume increases. Variations of this design include combining the bladder and sleeve by rubberizing the sleeve, and leaving the bladder ends disconnected from the sleeve. Various end fittings have been devised to transmit tensile force from the sleeve fibers into the mounting points. Various versions of McKibben muscles are available commercially from companies including Festo and the Shadow Robot Company.

An ideal McKibben muscle is considered to contract theoretically up to 42%, at which point the volume contained inside the shell reaches a maximum. Further contraction reduces the volume of pressurized fluid it holds. However, in practice, McKibben muscles are often found to contract by about 30%. The motion is generally similar to that of a biological muscle on the ascending limb portion of its motion range. This limitation requires significant extra space to be allocated for the actuator, which can be cumbersome and limit the usefulness of the device.

Pleated pneumatic artificial muscles use a bladder material with high stiffness and tensile strength, with no braided sleeve, and numerous axial folds that confer a pleated tube shape when stretched, and a spherical shape when inflated. The maximum theoretical contraction has found to be 54%, and the practical maximum is 45% for this type of muscle.

The Paynter knitted muscle works on the same basic principle as the pleated pneumatic artificial muscle, but is designed with a separate bladder and sleeve, each having tubular ends and a roughly spherical expanded section at the center. The bladder is an elastomer and the sleeve is made by knitting a stiff fiber like Dacron or Kevlar in a tubular pattern, with looser stitches in the middle to make the expanded section. The bladder is disposed within the sleeve and pressurized to fully expand until stopped by the sleeve, then the bladder and sleeve are bonded together with an adhesive. The adhesive bonding prevents sliding of the fiber strand crossings in the sleeve, preserving the wide, square-shaped stitches near the center and tight stitches near the ends. Pleats form irregularly when the actuator is stretched, but can be improved by heating within a pleated mold.

Given the limitations of the various conventional systems, there is a demand for an artificial muscle having an improved ability to contract. The present invention satisfies this demand.

SUMMARY OF THE INVENTION

In certain embodiments, the present invention includes an actuator system for moving an object. The actuator system includes a knitted sleeve within which is disposed a fluidic bladder that can be pressurized with a fluid, i.e., a liquid or gas.

In certain embodiments, the knitted sleeve is made of a substantially inextensible yarn. The terms yarn, fiber, and thread are used interchangeably in the application.

In certain embodiments, the knitted sleeve is made of an ultra-high molecular weight polyethylene In certain embodiments, the knitted sleeve is made of a high-tensile yarn, such as a para-aramid or an aramid.

In certain embodiments, the knitted sleeve is made of a low coefficient-of-friction yarn.

In certain embodiments, the actuator system further includes a lubricant to reduce friction.

In certain embodiments, the knitted sleeve is a tubular knitted sleeve.

One object of the present invention is to provide an actuator system for use in any suitable device or application.

It is an advantage that certain embodiments of the actuator system of the present invention achieve maximum volume at a relatively high degree of contraction.

Another advantage of certain embodiments of the actuator system of the present invention is that it may be used in series with linear springs for actuating constant loads.

An additional advantage of certain embodiments of the present invention is that the actuator system or knit muscle can employ energy more efficiently to pull a weight or spring a greater distance than other artificial muscles.

The present invention and its attributes and advantages will be further understood and appreciated with reference to the detailed description below of presently contemplated embodiments, taken in conjunction with the accompanying drawings.

BRIEF DESCRIPTION OF THE DRAWINGS

The preferred embodiments of the invention will be described in conjunction with the appended drawings provided to illustrate and not to the limit the invention.

FIG. 1 is a diagram of one embodiment of the present invention showing it in a stretched state (top), relaxed state (middle), and a pressurized state (bottom).

FIG. 2A is a drawing of a section of a flat knit according to one embodiment of the present invention.

FIG. 2B is a drawing of a section of one embodiment of the present invention showing the knitted sleeve component identifying a number of stitches (m), a number (n) of rows of stitches, a stitch width (w), a stitch height (h), and a sleeve length (L) along the muscle axis.

DETAILED DESCRIPTION

Figure 3:
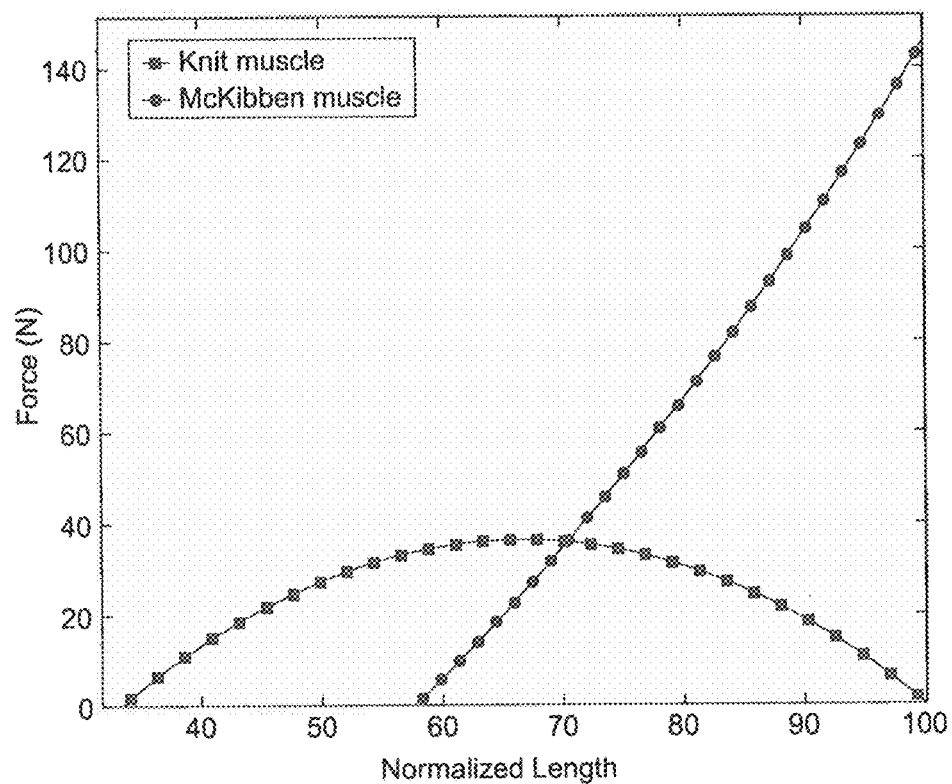
FIG. 3 is a force curve showing force as a function of normalized length of an embodiment of the present invention and a McKibben muscle.

In certain embodiments, the present invention provides a system 21 for actuating an object comprising a knitted sleeve 31 fitted about a pressurizable bladder 41. One embodiment of a system 21 according to the present invention is shown in FIG. 1, which shows a knitted-sleeve fluidic artificial muscle comprising a knitted sleeve 31 including eight stitches per row of Spectra thread. To demonstrate the utility of the system 21, the embodiment illustrated in FIG. 1 is shown fully stretched (top), in a relaxed state (middle), and pressurized with a fluid (bottom).

In certain embodiments, the system 21 is a knitted-sleeve muscle including a separate bladder component 41 and sleeve component 31. In certain embodiments, the knitted sleeve 31 is a tubular-knit sleeve made from a thin strand of flexible but inextensible yarn. In certain embodiments, the inextensible yarn or fiber is an ultra-high molecular weight polyethylene (UHMWPE). When the bladder 41 is pressurized, the loops of fiber slide past each other, the dimensions of the rectangular cells in the stitch pattern of the knitted sleeves change, and the knitted sleeve expands. In certain preferred embodiments, the internal volume of the sleeve 31 reaches a maximum when its length has contracted at least 50% from its maximum extension. In certain embodiments, the internal volume of the sleeve 31 reaches maximum volume when its length is contracted by a percentage in the range of from about 50% to about 66% from its maximum extension. In certain embodiments, the sleeve is made from a fiber having a relatively low coefficient of friction in order to reduce hysteresis to an acceptable level.

In certain embodiments, the sleeve 31 is knitted with a thin strand of substantially inextensible yarn or cord made from high-modulus fiber. In certain embodiments, the knitted sleeve 31 is made using a tubular-knitting machine similar in design to those used for sock knitting. However, in a small-diameter actuator, the number of needles must be reduced, e.g., to 8 or 16 needles, in order to obtain sufficiently wide spacing in the mesh. Hobby knitting machines, designed for making "I-cord", may be adapted for this purpose. In larger-diameter actuators, the number of needles used and thus, the number of stitches per row, may be increased. In certain embodiments, when the actuator is contracted, the rectangular cells in the sleeve may have side lengths of about 2 mm, depending on the bladder wall thickness and the fluid pressure. A thinner strand may permit greater contraction and extension. In certain embodiments, the knitted sleeve 31 is made from the thinnest strand that can reliably sustain the necessary tensile forces and sliding friction. In certain embodiments, the knitted sleeve 31 is made from high-tensile synthetics like para-aramids or aramids. In certain embodiments, the knitted sleeve is made from fiber having a low coefficient-of-friction, for example, is polytetrafluoroethylene (PTFE). UHMWPE is a good compromise between high-tensile strength fibers and low coefficient-of-friction fibers. In certain embodiments, the fibers may be made from high-tensile synthetics such as aramids, low coefficient-of-friction fibers such as PTFE, or UHMWPE.

In certain embodiments, the bladder 41 may be cut to an appropriate length and slid inside the sleeve 31. Alternatively, the bladder 41 may be placed into the sleeve 31 during the knitting process. A pressure fitting may be pressed into one end of the bladder 41 and connected to a hose through one of the openings in the sleeve 31. Clamping bands may be placed over both ends of the sleeve 31 stretching the bladder 41 if bladder pre-strain is desired, and clamped down tightly.

The knitted-sleeve muscle may be connected to and form a component of a larger system by directly wrapping or tying the ends of the sleeve strand 31 to mounting points on the structure to be actuated—no additional connectors are necessary. In applications in which the actuator is used to control motion of a joint, as in many robotic applications, one end of the sleeve strand may be fed directly into a cam track to provide a desired torque curve. The force may then be transmitted directly through the strong and stiff fibers and does not rely on clamp friction. The bladder 41 may be pressurized with any working fluid, including any suitable liquid or gas, including, but not limited to, air, water, steam, or if the bladder 41 is made from an oil-resistant elastomer, hydraulic fluid. The maximum working pressure will depend on the size of the cells in the sleeve and the thickness of the bladder wall. In certain embodiments, the sleeve 31 is tightly knitted and the pressure is 150 psi or greater.

The sleeve 31 may be constructed with a simple tubular knit 3.3, such as a stockinette stitch, with any number of stitches in a row. Reducing the number of stitches below eight has a significant effect on the force curve and maximum contraction. In certain embodiments, the sleeve 31 may be constructed using a garter stitch, rib knit, flat knit, or another variety of tubular knit.

In one embodiment, the sleeve may be constructed using a flat knit as shown in FIG. 2A. A flat knit consists of a fabric 50 with continuously connected interlocking stitches 52, each stitch 52 containing portions of thread 54 approximately parallel to the width, and portions of thread 56 approximately parallel to the length of the actuator, and curved portions 58A of thread that connect portions 54 parallel to the width with portions 56 parallel to the length, wherein each curved portion 58A of a stitch interlocks with the curved portion 58B of another stitch.

The bladder 41 may be made from any highly flexible material, including various kinds of synthetic or natural rubber. Any wall thickness, diameter, and bladder pre-strain may be used. In certain embodiments, the bladder 41 is not clamped to the sleeve at both ends. Greater contraction might be achieved by constraining the bladder length separately from the sleeve length, e.g., as done with the drag-in pneumatic artificial muscle (d-PAM). The pressure fitting can be placed at any point along the bladder 41, not just at an end, and multiple pressure fittings may be used. In place of clamps to hold the ends of the sleeve, wrappings of thread or tape may be used to apply the necessary constriction.

In contrast to the traditional McKibben muscle design, bonding the bladder 41 to the sleeve 31 or using a rubberized sleeve is not preferred, as this would prevent the sliding motion necessary for contraction of the actuator.

The actuator system 21 of the present invention knitted may be used in any of the devices of the type in which McKibben muscles are traditionally used. The actuator system 21 according to the present invention is especially useful in devices or applications in which space is constrained, because a shorter knitted-sleeve muscle can generate the same stroke length as a longer braided-sleeve muscle. Applications include prosthetics and other medical devices, industrial automation, aerospace vehicle actuators, and robotics.

As shown in the examples below, the force curve of the actuator system 21 of the present invention is flatter than that of a McKibben muscle, which has very high blocked force that drops off quickly when the muscle contracts slightly. Further, the actuator force of the actuator system 21 of the present invention rises somewhat during the initial portion of the stroke. Therefore, knitted-sleeve muscles may be more appropriate for placement in series with linear springs and may be simpler to control by position feedback.

Derivation of an Ideal Force Curve

Derivation of an ideal force curve for a knitted muscle requires specifying the geometric relationship between its length and its circumference, which together determine the volume as a function of contraction. In this case, instead of the sinusoidal relationship created by helical strands, the length and circumference are related linearly because each section of the strand is aligned either parallel or perpendicular to the muscle axis.

FIG. 2B is a drawing of a section of the knitted sleeve component 31 of the actuator system 21. The knitted sleeve component 31 is constructed from a fabric consisting of interlocking loops of thread 32, 33, the knitted sleeve 31 including a plurality of stitches 34, each stitch 34 consisting of an open loop 35 of thread 33 positioned so that it passes through a loop 36 of a previous stitch, the thread 33 bends 37a, 37b or curves approximately 90 degrees when it crosses over or under another length of thread 32, so that in a space of one stitch 34, the thread 33 bends from a section approximately parallel with a length of the fabric to a section approximately parallel with a width.

FIG. 2B shows the variables used to describe the geometry of the knitted sleeve 31. In a simplest model of a knitted sleeve, the sleeve 31 includes n rows, each made from a single strand that forms m stitches about the circumference of the muscle, with its ends connected to form a loop. The height of a stitch, which is the distance between rows, is h and the width of a stitch is w. The muscle length L=nh, and the circumference C=mw. Because each strand is substantially inextensible, the length of strand in one row is a constant $L_{row}$. The lengths of each stitch in a row can be added as follows:

$$L_{row} = m(2h + w)$$

$$w = \frac{L_{row}}{m} - 2h$$

This equation for w in terms of h forms the basis for calculating muscle volume as a function of length. The radius r can be calculated using the formula $$r = \frac{mw}{2\pi} = \frac{1}{2\pi}(L_{row} - 2mh),$$

which in turn can be used to calculate the volume V.

$$V = \pi r^2 L = \frac{L}{4\pi}(L_{row} - 2mh)^2$$

Expanding and substituting L=nh, $$V = \frac{m^2 n}{\pi} h^3 - \frac{mnL_{row}}{\pi} h^2 + \frac{nL_{row}^2}{4\pi} h = \frac{m^2}{\pi n^2} L^3 - \frac{mL_{row}}{\pi n} L^2 + \frac{L_{row}^2}{4\pi} L$$

$$\frac{dV}{dL} = \frac{3m^2}{\pi n^2} L^2 - \frac{2mL_{row}}{\pi n} L + \frac{L_{row}^2}{4\pi}$$

Force F is taken to be the derivative of work done by the fluid source:

$$F = -P\frac{dV}{dL} = -\frac{P}{4\pi n^2}(12m^2 L^2 - 8mnL_{row}L + n^2 L_{row}^2)$$

Thus, the force output is quadratic in L, but instead of using one leg of an upward parabola, the knitted muscle force curve is a downward parabola with its peak in the center of the stroke range, as illustrated in FIG. 3.

To determine the free contraction, we calculate the length of the muscle at which its volume is maximized:

$$\frac{dV}{dL} = 0 = \frac{3m^2}{\pi n^2} L^2 - \frac{2mL_{row}}{\pi n} L + \frac{L_{row}^2}{4\pi} = \frac{nL_{row}}{m}\left(\frac{1}{3} \pm \frac{1}{6}\right)$$

$$L_{free} = \frac{1}{3}\frac{nL_{row}}{m} \pm \frac{nL_{row}}{m}\sqrt{\frac{1}{9} - \frac{1}{12}}$$

Since the maximum height of a row when the muscle is fully stretched is $$h_{max} = \frac{L_{row}}{2m},$$

the stretched muscle length is $$L_{max} = nh_{max} = \frac{nL_{row}}{2m}$$

Combining those and choosing the solution at which volume is maximized, we find that $L_{free}=L_{max}/3$, one third of the stretched length. Therefore, the ideal knitted muscle could contract by up to 67%, compared with 42% for an ideal McKibben muscle.

Tubular-Knit Model

Figure 4:
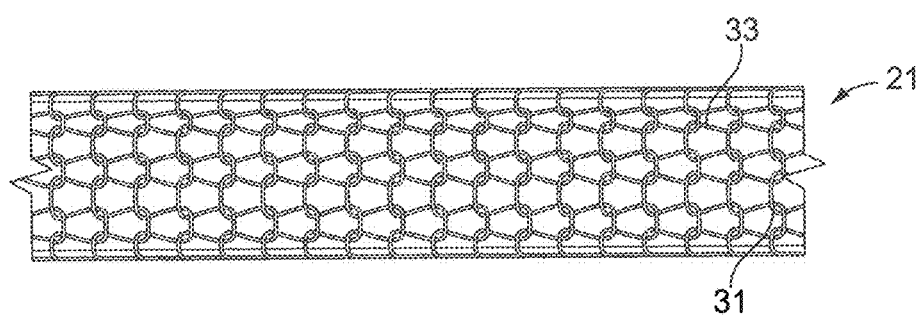
FIG. 4 illustrates a portion of an embodiment of the present invention.

The model above assumes that each row of the knitted sleeve 31 consists of a separate yarn loop. In practice, there is no easy way to assemble such loops into a knitted tube. Instead, in certain embodiments, the knitted sleeve 31 is made using a technique known as tubular knitting or "knitting in the round," which is commonly used for making socks and other cylindrical fabric items. Instead of each row connecting to itself, the end of one row becomes the beginning of the next row, so that the entire piece is actually made from a single strand of yarn, making this design easy to produce on a common knitting machine. However, it also invalidates the assumption that each row runs circumferentially, perpendicular to the muscle axis. Instead, the stitches go around in a gradual spiral, with each section at a slight angle compared to the circumference (FIG. 4).

Making the appropriate changes to the sleeve geometry, the above equations are modified as follows:

$$L_{max} = nh_{max} = \frac{nL_{row}}{2m+1}$$

$$L_{row} = m(2h) + \sqrt{m^2 w^2 + h^2}$$

$$w^2 = \frac{1}{m^2}(L_{row}^2 - 4hmL_{row} + 4h^2 m^2 - h^2)$$

$$r = \frac{mw}{2\pi}$$

$$V = \pi r^2 L = \frac{L}{4\pi}(L_{row}^2 - 2hmL_{row} + h^2(4m^2 - 1))$$

$$= \frac{1}{4\pi n^2}((4m^2 - 1)L^3 - 2mnL_{row}L^2 + L_{row}^2 n^2 L)$$

$$\frac{dV}{dL} = \frac{3}{4\pi n^2}(4m^2 - 1)L^2 - \frac{2m}{\pi n}L_{row}L + \frac{L_{row}^2}{4\pi}$$

$$F = -P\frac{dV}{dL} = -\frac{P}{4\pi n^2}(3(4m^2 - 1)L^2 - 8mnL_{row}L + L_{row}^2 n^2)$$

Figure 5:
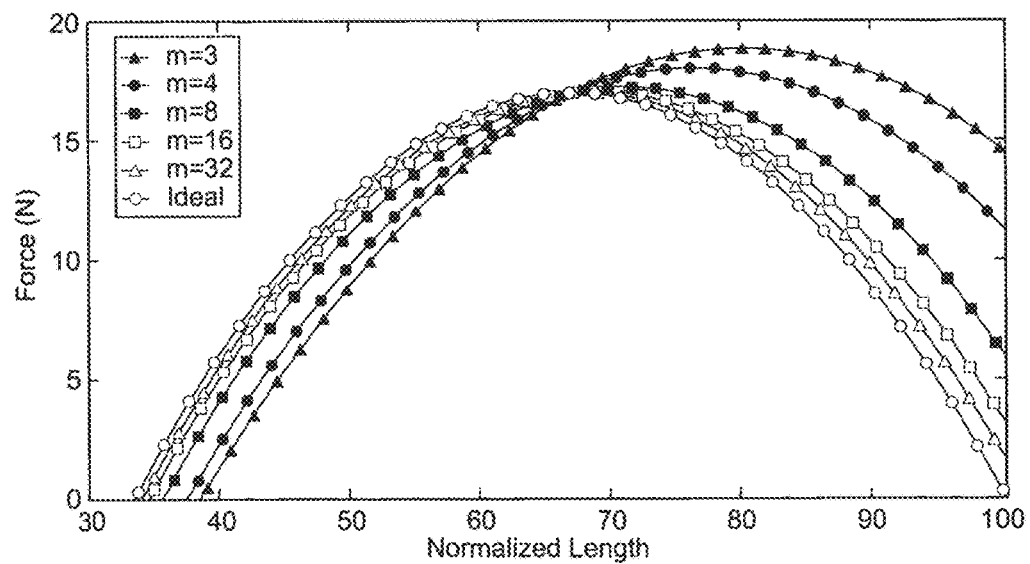
FIG. 5 shows force curves for various embodiments of the present invention each including a different number of stitches (m) per row.

The change in the force curve (FIG. 5) is especially noticeable when the number of stitches per row is small, and may be safely neglected when m>16.

Thick Strand Model

Figure 6:
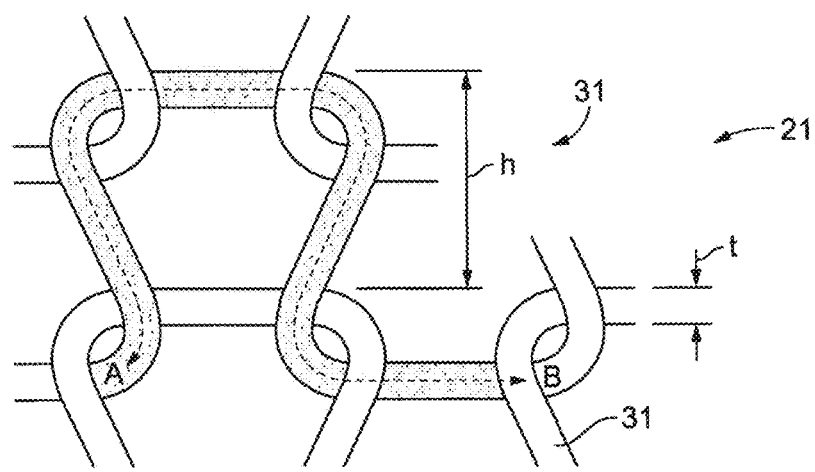
FIG. 6 is a diagram of one embodiment of the present invention identifying a stitch of strand thickness (t), stitch height (h), and stitch width (w); the length of the shaded section A-B is the length of strand section that forms one stitch, $L_{row}/m$.

A second correction that can substantially improve the accuracy of the force model above is the assumption that the thread making up the sleeve has significant thickness t, which constrains both the maximum length and the maximum sleeve diameter, reducing the range of motion. FIG. 6 shows how the length of strand in one stitch, $L_{row}/m$, is no longer equal to 2h+w as before, but must include a correction for the thickness. Indicated parameters are strand thickness t, stitch height h, and stitch width w. The length of the shaded section A-B is the length of strand section that forms one stitch, $L_{row}/m$.

$$\frac{L_{row}}{m} \approx 2(2t + h) + w$$

Given this assumption about strand length, the corrected force equation is:

$$F = -\frac{P}{4\pi n^2}\left(12L^2 + \left(32nt - 8\frac{L_{row}n}{m}\right)L + n^2\left(\frac{L_{row}^2}{m^2} - \frac{8tL_{row}}{m} + 16t^2\right)\right)$$

Inclusion of Bladder Effects

Figure 7:
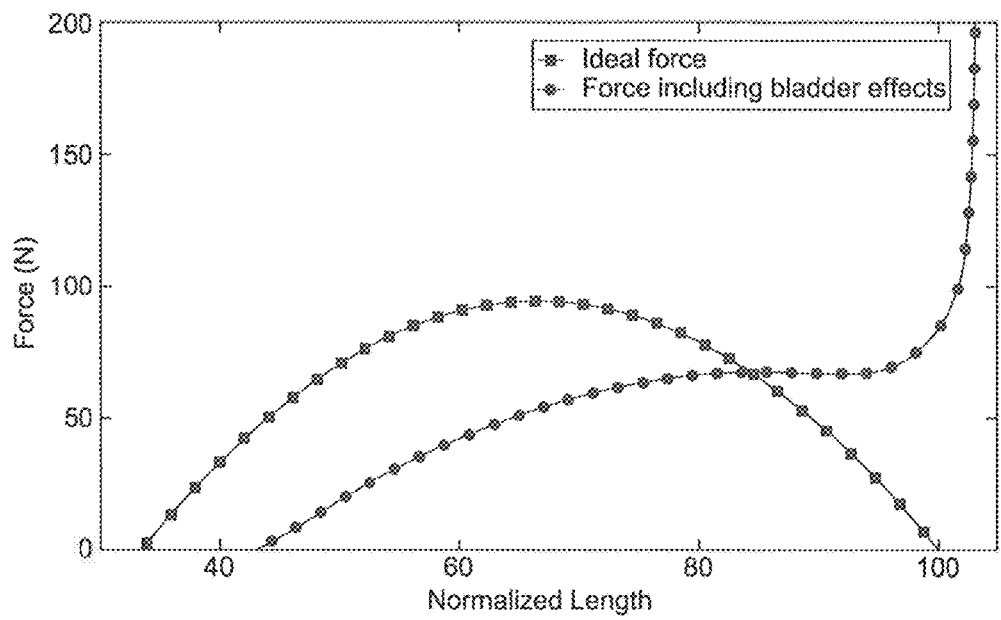
FIG. 7 shows an ideal force curve and a force curve including bladder effects for one embodiment of the present invention.

The inclusion of a rubber bladder with non-negligible thickness, along with its effects on the force output of the actuator, has been thoroughly studied for McKibben muscles. These results apply to a knit muscle. A force curve (FIG. 7) was generated by applying the methods described in Ball, E. and Garcia, E., "Effects of Geometric Variations on McKibben Pneumatic Artificial Muscles," Proc. SPIE, 2013 to the knit muscle model. FIG. 7 shows the predicted force-displacement curves for an 11 cm knitted-sleeve fluidic artificial muscle, maximum diameter during stroke 14.6 mm, at 80 psi. The ideal force curve is the ideal geometric case in which the bladder and strand thicknesses are insignificant, and reaches 67% displacement. The force including bladder effects curve includes the effects of a thick-walled rubber bladder with no pre-strain, with 0.2 mm strand thickness. Both curves neglect the tubular-knit correction described above. The predicted work done in one contraction stroke is 2.6 J. The force curve that takes into account bladder effect s lower overall than ideal, with reduced free contraction, but has a higher initial force near maximum length, (FIG. 7). Pre-straining the bladder could potentially increase actuator force and stroke.

Figure 8:
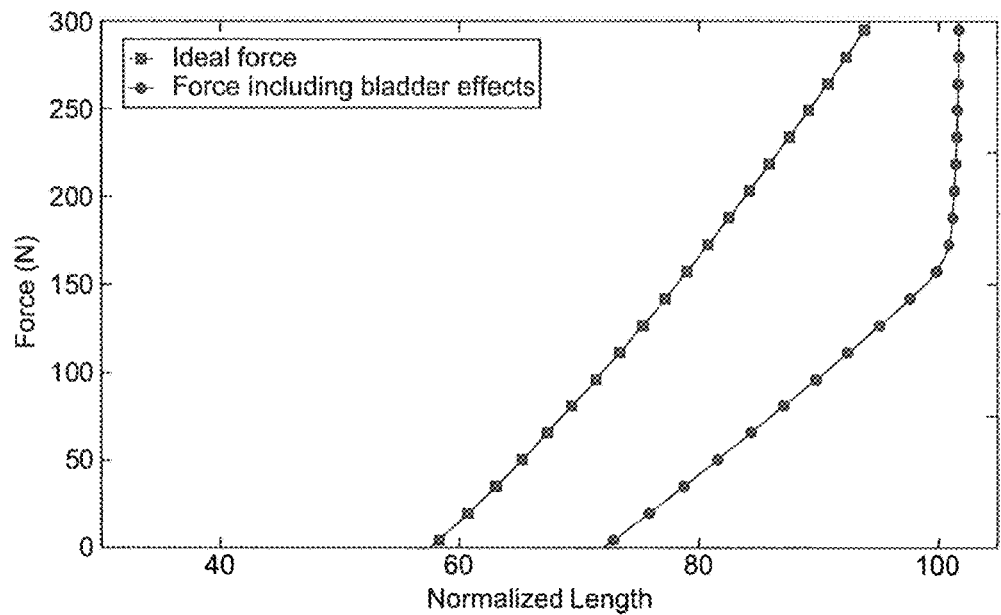
FIG. 8 shows an ideal force curve and a force curve including bladder effects for a McKibben muscle.

FIG. 8 shows a force curve for equivalent a traditional McKibben muscle with the same length; diameter, and pressure as the knitted muscle system of FIG. 7. Including bladder effects, the work of one stroke is 2.3 J, less than the contraction work of the knitted muscle; even though an ideal McKibben muscle performs more work than an ideal knitted muscle.

Muscle Testing

A prototype knitted muscle was constructed for quasi-static testing, using the tubular-knitting technique described above. In this embodiment; the knitting machine used to make the knitted sleeve was an Addi Express Professional with 22 needles. The "yarn" must be thin and made from an inextensible high-modulus fiber, to best approximate the ideal model; Spectra (UHMWPE) fishing line rated to 50 lbf was used. UHMWPE is advantageous because of its combination of high stiffness and strength (allowing it to be thin) and its low coefficient of friction to reduce hysteresis.

The bladder was made of a thin polyethylene bag membrane; in order to reduce passive force effects from stretching of the bladder. In contrast to the construction of a McKibben muscle; bonding the bladder to the sleeve or using a rubberized sleeve is not an option, as this would prevent the sliding motion of the sleeve threads necessary for contraction of the actuator.

The bladder was placed inside the sleeve and connected at the ends by circular clamps. A simple barbed hose fitting was clamped into one end to allow the application of pressurized air. The bladder was cut slightly shorter than the sleeve so that extra material was available at the ends (outside the clamps) for tying into mounting points on the object to be actuated. This attachment method allows tensile force to be transmitted through the stiff fibers directly, and does not rely on clamp friction to prevent stretching of the actuator. The prototype had a stretched length of 51.4 cm, m=22, n=49, maximum sleeve diameter 15.3 cm, and maximum bladder diameter roughly 8.5 cm.

Experimental Setup

The prototype knitted muscle was tied into an Instron tensile testing machine and quasi-static tensile tests were performed over the stroke length of the actuator on both the contraction and extension strokes in order to validate the theoretical force curves and estimate hysteresis. All tests were performed with the muscle pressurized to approximately 4 psi with air. Crosshead speed was 40 mm/minute for both extension and contraction.

Figure 9:
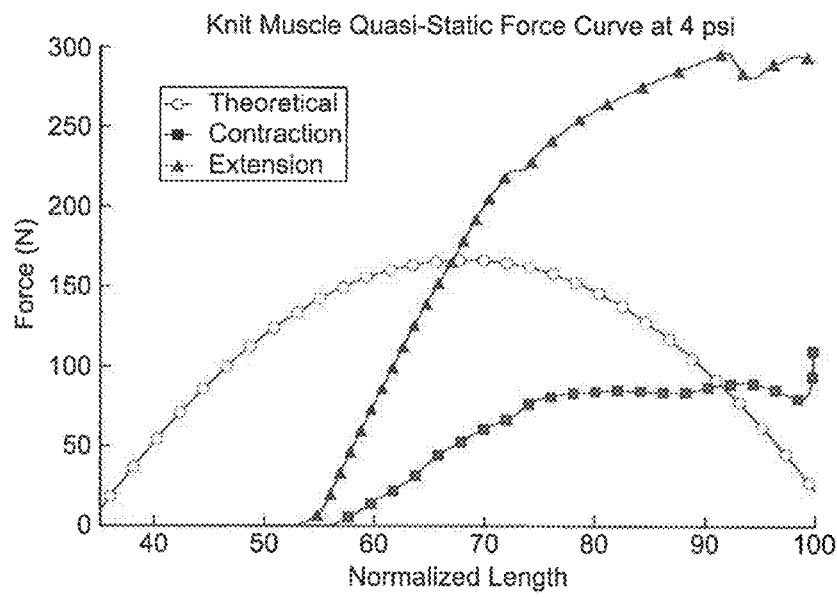
FIG. 9 shows theoretical, extension, and contraction force curves from experimental data for one embodiment of the present invention.

FIG. 9 shows the result of tensile testing and the corresponding theoretical prediction. Maximum contraction observed in this test was 45%. Free contraction at 15 psi was measured at 51%, The increased contraction at higher pressure is likely due to stretching of the polyethylene bladder.

With reference to FIG. 9, the force curve of the prototype diverges from the theoretical prediction in several ways. First, extension force is about three times as high as contraction force at the same pressure, which suggests that friction has a more significant effect in this prototype than in a typical McKibben muscle. Second, maximum contraction is significantly lower than predicted; this is due partly to strand thickness effects, and may be caused partly by the maximum bladder diameter being less than the maximum sleeve diameter. Lastly, the data does not show the distinct "descending limb" portion of the curve when the muscle is near its maximum length. Instead, the force appears to stay nearly constant over the first 25% contraction. This discrepancy is related to the progressive inflation of the muscle down its length.

A McKibben muscle has very high blocked force because at full length, its circumference varies as sin θ and rises quickly with a slight increase in braid angle, but its length varies as 1−cos θ and so changes hardly at all with the initial increase in angle—thus, an initial small decrease in length comes with a large volume increase. However, the force drops off quickly once the muscle contracts slightly, so when the McKibben muscle is employed to lift a constant load, or to tension a spring, the initial high force is wasted. Once the force falls below the load, the rest of the stroke is unusable. Because the knit muscle force curve is flatter than that of a McKibben muscle, and in fact the actuator force may rise somewhat during the initial portion of the stroke, knitted-sleeve muscles are more appropriate for use in series with linear springs and for actuating constant loads. Despite its lower maximum force and lower energy output per stroke, under the right circumstances, the knit muscle can employ that energy more efficiently to pull a weight or spring a greater distance. When any artificial muscle is used to actuate a joint, the torque can be made constant by changing the lever arm of the attachment point to balance the change in actuator force. But for a McKibben muscle, the necessary changes in lever arm or cam radius are much more extreme than for the relatively constant force output of a knit muscle.

Figure 10:
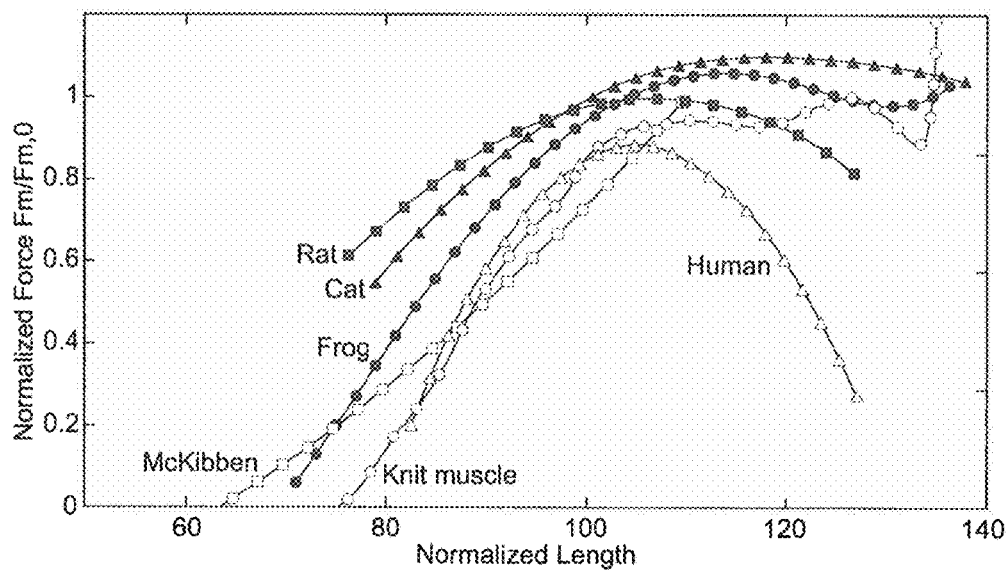
FIG. 10 compares force curves for one embodiment of the present invention, a McKibben artificial muscle, and those for a rat, cat, frog, and a human.

Finally, knit muscles have greater similarity to the behavior of animals' skeletal muscle than other types of fluidic artificial muscle. FIG. 10 compares quasi-static force curves for animal muscles and fluidic artificial muscles.

Not only is the stroke length of a knit muscle closer to that of animal muscle than that of a McKibben muscle, the knit muscle also has an extended plateau region in which force output is nearly constant. This plateau area is used extensively in skeletal motion. Other fluidic artificial muscles have only an ascending limb, the leftmost portion of the force curve, in which force increases steadily with length, leaving other fluidic artificial muscles unable to mimic some functions of animal muscle.

While the disclosure is susceptible to various modifications and alternative forms, specific exemplary embodiments of the present invention have been shown by way of example in the drawings and have been described in detail. It should be understood, however, that there is no intent to limit the disclosure to the particular embodiments disclosed, but on the contrary, the intention is to cover all modifications, equivalents, and alternatives falling within the scope of the disclosure as defined by the appended claims.

What is claimed is:

1. A system for actuating an object, comprising:
   an actuator comprising a fluid-pressurizable bladder and a knitted sleeve, the actuator comprising a length, a width defining a diameter, and an internal volume,
   the knitted sleeve constructed from a fabric comprising a plurality of continuously connected interlocking stitches, each stitch containing portions of thread approximately parallel to the width and portions of thread approximately parallel to the length of the actuator, and curved portions of thread that connect portions parallel to the width with portions parallel to the length, wherein each curved portion of a stitch interlocks with the curved portion of another stitch,
   the knitted sleeve positioned generally around the fluid-pressurizable bladder, the sleeve configured to expand in diameter when the bladder is pressurized by lengthening the portions of each stitch parallel to the width and shortening the portions parallel to the length, while the total length of thread comprising each stitch remains nearly constant.

2. The system of claim 1, wherein the thread is made from an ultra-high molecular weight polyethylene (UHMWPE).

3. The system of claim 1, wherein the thread is made from a high-tensile synthetic.

4. The system of claim 3, wherein the high-tensile synthetic is a para aramid.

5. The system of claim 3, wherein the high-tensile synthetic is an aramid.

6. The system of claim 1, wherein the thread is made from a low coefficient-of-friction fiber.

7. The system of claim 6, wherein the low coefficient-of-friction fiber is polytetrafluoroethylene (PTFE).

8. The system of claim 1, wherein the knitted sleeve is made with a tubular knit.

9. The system of claim 1, wherein the knitted sleeve is made with a flat knit.

10. The system of claim 1, wherein the internal volume of the actuator reaches a maximum volume when the length is contracted at least 50% from a maximum extension.

11. The system of claim 1, wherein the internal volume of the actuator reaches a maximum volume when the length is contracted in the range of from about 50% to about 66% from a maximum extension.

12. A knitted muscle, comprising:
   a knitted sleeve defined by a length, a width defining a diameter, and a force curve,
   the knitted sleeve constructed from a fabric consisting of a plurality of continuously connected interlocking stitches, each stitch consisting of portions of thread approximately parallel to the width, and portions of thread approximately parallel to the length of the actuator, and curved portions of thread that connect portions parallel to the width with portions parallel to the length, wherein each curved portion of a stitch interlocks with the curved portion of another stitch,
   the sleeve configured to expand in diameter when a bladder is pressurized by lengthening the portions of each stitch parallel to the width and shortening the portions parallel to the length, while the total length of thread comprising each stitch remains nearly constant.

13. The knitted muscle according to claim 12, wherein the approximate force curve is:

$$F = -\frac{P}{4\pi n^2}(12m^2L^2 - 8mnL_{row}L + n^2L_{row}^2),$$

wherein P is pressure, n is a number of rows each made from a strand that forms m stitches about a circumference, L is the length, and $L_{row}$ is a length of a strand in one row.

14. The knitted muscle according to claim 12, wherein the approximate force curve is:

$$F = -\frac{P}{4\pi n^2}(3(4m^2 - 1)L^2 - 8mnL_{row}L + L_{row}^2 n^2),$$

wherein P is pressure, n is a number of rows each made from a strand that forms m stitches about a circumference, L is the length, and $L_{row}$ is a length of a strand in one row.

15. The knitted muscle according to claim 12, wherein the approximate force curve is:

$$F = -\frac{P}{4\pi n^2}\left(12L^2 + \left(32nt - 8\frac{L_{row}n}{m}\right)L + n^2\left(\frac{L_{row}^2}{m^2} - \frac{8tL_{row}}{m} + 16t^2\right)\right),$$

wherein P is pressure, n is a number of rows each made from a strand that forms m stitches about a circumference, t is strand thickness, L is the length, and $L_{row}$ is a length of a strand in one row.

16. A system for actuating an object, comprising:
an actuator comprising a fluid-pressurizable bladder and a fabric sleeve, the actuator comprising a length, a width defining a diameter, and an internal volume,
the fabric sleeve being constructed from small closed loops of thread, each connected to at least four other loops by passing through them, each containing portions of thread approximately parallel to the width, and portions of thread approximately parallel to the length of the actuator, and curved portions of thread that connect portions parallel to the width with portions parallel to the length, wherein each curved portion of a loop interlocks with the curved portion of another loop,
the fabric sleeve positioned generally around the fluid-pressurizable bladder, wherein the bladder expands when pressurized causing the portions of each stitch parallel to the width to lengthen and the portions parallel to the length to shorten the loops of thread to change shape through a sliding motion of the threads, to decrease the length of the actuator and increase the diameter of the actuator.

17. The system of claim 16, wherein the internal volume of the actuator reaches a maximum volume when the length is contracted at least 50% from a maximum extension.

18. The system of claim 16, wherein the internal volume of the actuator reaches a maximum volume when the length is contracted in the range of from about 50% to about 66% from a maximum extension.

* * * * *